United States Patent [19]

McCorsley, III

[11] 4,246,221

[45] Jan. 20, 1981

[54] PROCESS FOR SHAPED CELLULOSE ARTICLE PREPARED FROM A SOLUTION CONTAINING CELLULOSE DISSOLVED IN A TERTIARY AMINE N-OXIDE SOLVENT

[75] Inventor: Clarence C. McCorsley, III, Asheville, N.C.

[73] Assignee: Akzona Incorporated, Asheville, N.C.

[21] Appl. No.: 16,789

[22] Filed: Mar. 2, 1979

Related U.S. Application Data

[63] Continuation-in-part of Ser. No. 847,200, Oct. 31, 1977, abandoned, and a continuation-in-part of Ser. No. 819,082, Jul. 26, 1977, Pat. No. 4,144,080.

[51] Int. Cl.³ .............................................. D01F 6/00
[52] U.S. Cl. ................................. 264/203; 264/208; 264/210.8; 536/56; 536/57
[58] Field of Search .............. 106/125, 168, 176, 126, 106/186, 198, 123 R, 162, 163; 264/187, 203, 208, 210.7, 210.8; 536/56, 57

[56] References Cited

U.S. PATENT DOCUMENTS

| 2,179,181 | 11/1939 | Graenacher et al. ..................... 8/35 |
| 3,447,956 | 6/1969 | Johnson ................. 8/130.1 |
| 3,508,941 | 4/1970 | Johnson ............................. 106/126 |
| 3,842,151 | 10/1974 | Stoy et al. ........................... 264/203 |
| 4,028,132 | 6/1977 | Litt et al. .......................... 106/163 R |
| 4,142,913 | 3/1979 | McCorsley et al. ................ 106/186 |
| 4,144,080 | 3/1979 | McCorsley et al. ................ 106/186 |

Primary Examiner—Jay H. Woo
Attorney, Agent, or Firm—Francis W. Young; Jack H. Hall

[57] ABSTRACT

A solution containing cellulose dissolved in a tertiary amine N-oxide solvent containing a nonsolvent for cellulose such as water is shaped by extrusion or other shaping process to form a shaped cellulose fiber, rod, plate, tubing or film. The extruded shaped article is stretched in air while still a solution to impart improved physical properties thereto and the cellulose is precipitated from the shaped solution to set the properties without additional drawing. The solution may be prepared by dissolving cellulose in the tertiary amine N-oxide solvent in the barrel of an extrusion apparatus, extruding the solution, orienting by stretching the resulting product in air while still a solution and then precipitating the cellulose from the shaped article before significant degradation of the cellulose. The cellulose and tertiary amine N-oxide may be ground to substantially the same particle size before charging the extruder barrel. The tertiary amine N-oxide is recovered and recycled to avoid environmental pollution problems. The resulting cellulose fibers or films can be used to make fabrics, wrapping or packaging materials or nonwoven products.

6 Claims, 4 Drawing Figures

PROCESS FOR SHAPED CELLULOSE ARTICLE PREPARED FROM A SOLUTION CONTAINING CELLULOSE DISSOLVED IN A TERTIARY AMINE N-OXIDE SOLVENT

This invention relates generally to cellulose and, more particularly, to shaped cellulose articles such as fibers, yarns, fabrics and the like having some properties which are similar to those of corresponding cotton articles. This application is a continuation-in-part of my application Ser. No. 847,200 filed Oct. 31, 1977 now abandoned and Ser. No. 819,082 filed on July 26, 1977 now U.S. Pat. No. 4,144,080.

It has been proposed before to make shaped cellulose articles such as fibers and films by a process wherein cellulose or a derivative of cellulose is dissolved in a solvent, the resulting solution is shaped and the cellulose is recovered from the solution as a solid shaped article. Such processes include the viscose process and cuprammonium process for making rayon. Rayon, however, is not entirely satisfactory for making some fabrics normally made with cotton because relatively poor mechanical properties, high swelling, and a sharp increase in wet elongation under low stress exclude its use where shape retention after washing is important. The low wet modulus of regular viscose makes it noncompetitive with cotton in the area of washable textiles, whereas fibers of the invention having high wet and conditioned moduli are much less affected by moisture variations and compare favourable with cotton in terms of moduli and, consequently, dimensional stability. Even in blends of synthetic fibers having 50% or more rayon content, there is a need for higher modulus rayon types, a need not satisfactorily filled by the use of cotton because of the higher cost of the cotton component. Moreover, the above rayon processes have the disadvantages that their by-products such as sulfur compounds, ammonia, copper salts, and zinc salts pollute not only the atmosphere but streams into which they are discharged unless they are completely removed or chemically disposed of before they are discharged into the environment.

Bockno in U.S. Pat. No. 3,277,226 discloses a process for making a regenerated cellulose fiber having a wet modulus which is higher than that of conventional viscose rayon. However, the viscose solution of Bockno has the same pollution problems as those of conventional viscose processes and some physical properties of the resulting fibers are inferior to those of cotton.

It has also been proposed to make shaped cellulose articles from a tertiary amine N-oxide solution of cellulose. One process for dissolving cellulose in a tertiary amine N-oxide is disclosed, for example, by Graenacher et al in U.S. Pat. No. 2,179,181. In accordance with the disclosure, oxides of trimethylamine, triethylamine, tripropylamine, monomethyldiethylamine, dimethylmonoethylamine, monomethyldipropylamine, N-dimethyl-, N-diethyl- or N-dipropylcyclohexylamine, N-dimethylmethylcyclohexylamine and pyridine may be used. The solutions disclosed by Graenacher et al have the disadvantage of having relatively low solids contents of from 7% to 10% by weight of cellulose dissolved in 93% to 90% by weight of the tertiary amine N-oxide. Such low solids solutions are not entirely satisfactory for extruding, spinning or other shaping processes because a large amount of solvent must be removed from the shaped product. Insofar as the disclosure is concerned, the Graenacher et al solution is anhydrous.

Johnson in U.S. Pat. No. 3,447,939 discloses a process for dissolving cellulose in an anhydrous tertiary amine N-oxide. A cyclic mono (N-methylamine-N-oxide) compound such as N-methylmorpholine N-oxide is used as the solvent. The solution is disclosed for use in chemical reactions involving the dissolved compound or to precipitate the cellulose to form a film or filament. The disclosed process has many of the disadvantages of the process disclosed in U.S. Pat. No. 2,179,181, because the solutions are of low solids content.

In accordance with the process disclosed by Johnson in U.S. Pat. No. 3,508,941, two or more different polymers are dissolved in a solvent consisting of a cyclic mono-(N-methylamine-N-oxide) compound and the polymers are precipitated together to produce a polymer mixture. A nonsolvent for cellulose such as dimethylsulfoxide, N-methyl-pyrrolidone or sulfolane may be added to the solution as a diluent to reduce its viscosity. The disclosed solutions are also of low solids and have the same disadvantages as those of U.S. Pat. Nos. 2,179,181 and 3,447,939. In U.S. Pat. No. 3,508,941, Johnson discloses a process for spinning the solution directly into cold methanol to precipitate the cellulose in the resulting filament. The resulting filament has a relatively low strength.

Griggs in U.S. Pat. No. 3,503,700 issued Mar. 31, 1970, discloses a process for improving the wet and dry strength of a fibrous material and for improving its water repellancy by wetting the material with a tertiary amine N-oxide and a ketene dimer. The polymer in these materials is not dissolved to form a solution which can be shaped by extrusion.

It is an object of this invention to provide an improved process for making solutions containing cellulose dissolved in a tertiary amine N-oxide solvent and for making shaped cellulose products such as fibers and films from solutions containing cellulose dissolved in a tertiary amine N-oxide solvent which are free from the above disadvantages of the prior art processes for making shaped cellulose products from solutions. Another object of the invention is to provide a process for making shaped cellulose products having improved physical properties from solutions in which a tertiary amine N-oxide is the solvent. A further object of the invention is to provide a cellulose fiber shaped from a solution of cellulose having properties which resemble cotton fibers. A still further object of the invention is to provide a cellulose fiber having an improved modulus which is prepared by shaping and processing a tertiary amine N-oxide solution containing cellulose. More specifically, an object of the invention is to provide a shaped cellulosic fiber having properties similar to cotton, namely, good mechanical properties, low swelling, and only a slight increase in wet elongation over conditioned elongation at low stress. Still another object of the invention is to provide a shaped cellulose article which has physical properties which are an improvement over those of a shaped conventional regenerated cellulose product. Another object of the invention is to provide a process for making a shaped cellulose article from a solution which does not pollute the environment with waste products containing metal salts, sulfur compounds, or ammonia.

Other objects will become apparent from the following description with reference to the accompanying drawing wherein FIG. 1 is a block diagram illustrating an embodiment of the process provided by the invention;

Figure 1:
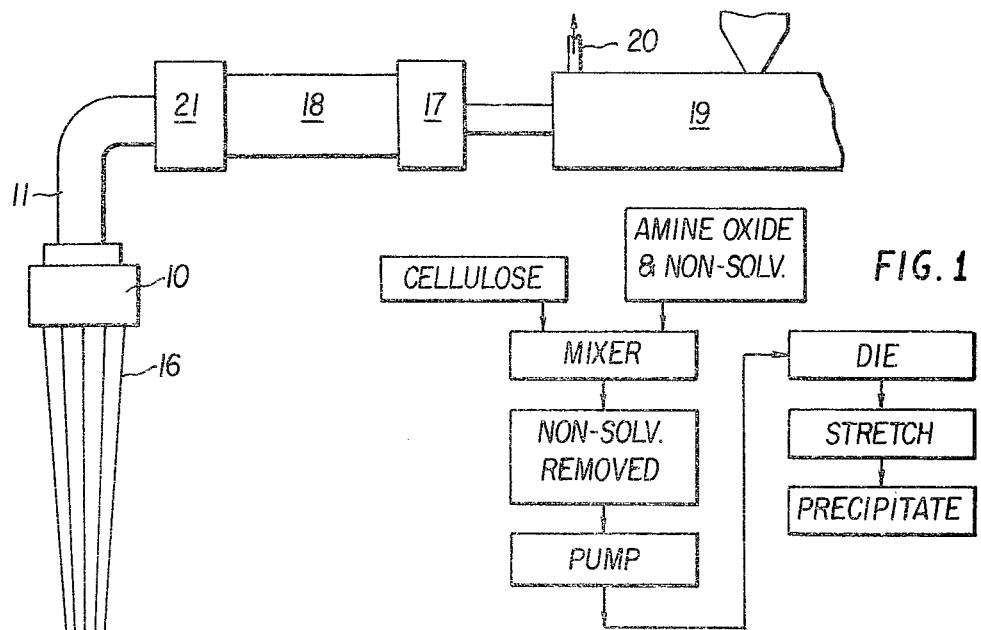

The foregoing objects and others are accomplished in accordance with this invention, generally speaking, by providing shaped cellulose articles which have properties similar to those of cotton articles and a process for making such shaped cellulose articles from a solution containing cellulose dissolved in a tertiary amine N-oxide solvent. The invention is especially concerned with the preparation of a cellulose fiber from a solution containing cellulose dissolved in a tertiary amine N-oxide solvent which has a higher wet modulus than that of rayon and which is approximately equal to the wet modulus of cotton.

In accordance with the invention, cellulose is dissolved in a solvent containing a tertiary amine N-oxide and water which is a solvent for the cellulose, the solution is shaped by extrusion or spinning first into air or other nonprecipitating medium to form a film or filament, the film or filament is stretched in the medium to impart improved physical properties thereto prior to precipitation of the cellulose and is then treated with a nonsolvent which precipitates the cellulose. The shaped solution emerging from the shaping die is pulled from its point of emergence from the die at a speed faster than its emergence speed so it is stretched and reduced in thickness in the space before the cellulose is precipitated with a nonsolvent. The amount of stretching is defined by the spin-stretch ratio which is the linear speed of the precipitated article divided by the linear speed of the solution emerging from the die. This stretching before precipitation orients the cellulose molecules in the solution and develops the properties of the resulting shaped article prior to precipitation of the cellulose. The precipitation of the cellulose sets the properties. Subsequent drawing of the filament after precipitation is not necessary. This eliminates the need for drawing apparatus and its attendant capital expenditure. The spin-stretch ratio is to be at least 3. The spin-stretch ratio used is dependent upon the geometry of the die, the solution viscosity which in turn depends upon cellulose, the cellulose source, the cellulose concentration, the degree of polymerization of the cellulose, the temperature and the composition of the solvent.

The solution to be shaped may be prepared by any suitable process and in any apparatus in which the cellulose is dissolved in a mixture of a tertiary amine N-oxide and water. Suitable solutions, and processes for making the solution and for spinning or extruding the solution are described in my earlier applications for U.S. Pat. Nos. 847,200 filed on Oct. 31, 1977 and 819,082 filed on July 26, 1977. Other suitable solutions and processes are disclosed in application Ser. Nos. 819,080 and 819,081 filed by McCorsley and Varga on July 26, 1977, Ser. No. 854,957 filed by Franks and Varga on Nov. 25, 1977, Ser. No. 938,906 filed by Varga on Sept. 1, 1978; and Ser. No. 938,907 filed by Franks and Varga on Sept. 1, 1978, all assigned to the assignee of this application, the disclosures of which are incorporated herein by reference.

In accordance with the disclosure in application Ser. No. 819,080, cellulose is impregnated with a tertiary amine N-oxide-water mixture under conditions (excess water or organic liquid nonsolvent) where the mixture is a nonsolvent for the cellulose to form a product which can later be converted into a solution by converting the absorbed nonsolvent into a solvent for the cellulose by heating and/or removal of the excess water or organic nonsolvent. A process for increasing the rate at which cellulose dissolves in a tertiary amine N-oxide by mixing therewith an alkaline compound such as an alkali metal hydroxide, an amine or aqueous ammonia is disclosed in application Ser. No. 938,906.

The preparation of a solution of cellulose in a tertiary amine N-oxide and water in the barrel of an extrusion apparatus and extrusion of the solution prior to degradation of the cellulose is disclosed in my application No. 819,082.

Another process for making a solid precursor of a solution of cellulose in a tertiary amine N-oxide is disclosed in application Ser. No. 819,081 wherein cellulose is mixed with a water containing tertiary amine N-oxide which dissolves the cellulose and the solution is cooled to form a solid product. The solid product can be heated later to form a solution without the addition of more solvent.

The solution may be prepared in any suitable heated mixing apparatus but any apparatus which provides mixing and is adapted to remove water and other nonsolvents under vacuum is preferred.

The preferred solution for processing in accordance with this invention is prepared in accordance with the disclosure in application Ser. No. 938,907 filed by Franks and Varga on Sept. 1, 1978. In accordance with the disclosed process, a mixture of water and a tertiary amine N-oxide which will dissolve the cellulose is used as the solvent. The solubility of cellulose in the mixture of water and tertiary amine N-oxide decreases linearly as the amount of water in the mixture is increased. The water is believed to swell the pulp fibers and assist in contacting the fibers with the tertiary amine N-oxide. Such a solution when processed as described herein produces the spun fiber of the invention having the improved physical properties.

As set forth in my application Ser. No. 819,082 filed on July 26, 1977, degradation of cellulose can be avoided or substantially reduced by dissolving the cellulose in a tertiary amine N-oxide solvent in the barrel of an extrusion apparatus, extruding the solution to form a shaped solution such as a film or filament and promptly precipitating the cellulose from the shaped solution before significant degradation of the cellulose.

In order to facilitate solution of the cellulose in its solvent in the extruder, it has been proposed in application Ser. No. 819,082 to steep cellulose in the tertiary amine N-oxide at a temperature where the cellulose does not dissolve and to charge chips of cellulose impregnated with tertiary amine N-oxide to the extruder barrel. Such a process ensures intimate mixing of cellulose with its solvent which accelerates solution of the cellulose in the solvent. While such a process has its advantages, it also has the disadvantage of requiring storage of cellulose wet with tertiary amine N-oxide under substantially anhydrous conditions and at a temperature where the cellulose does not dissolve prior to its addition to the extruder. It has now been found that a uniform solution of cellulose can be prepared continuously in an extruder or other suitable equipment without requiring that a chip impregnated with solvent be prepared first.

It has been found that cellulose dissolves rapidly and forms a solution of cellulose in tertiary amine N-oxide of more uniform composition when the tertiary amine N-oxide containing the preferred amount of water and the cellulose are ground to the same predetermined particle size and charged simultaneously to the barrel of an extruder. The tertiary amine N-oxide and cellulose may be ground in any suitable grinding apparatus which reduces the cellulose particle size without significant degradation of the cellulose molecular weight.

Best results have been obtained if the mixture introduced to the extruder contains from about 10% to about 40% by weight cellulose, 0 to 20% by weight water and about 90% to 50% by weight tertiary amine N-oxide so it is preferred to mix the ground cellulose and the tertiary amine N-oxide containing water in such proportions.

The mixture may be fed as such to an extruder and heated to dissolve the cellulose in the tertiary amine N-oxide-water mixture or the components of the mixture may be fed separately and mixed together by the extruder screw thus avoiding the necessity of premixing. The preferred temperature range in the barrel of the extruder for dissolving the cellulose is from about 90° C. to about 140° C. The extruder may be operated at any suitable screw speed. The resulting solution is extruded to form a film or filament, stretched and the cellulose is precipitated from the solvent.

It has also been found that cellulose can be dissolved by first mixing pulp with tertiary amine N-oxide containing excess nonsolvent, preferably water, in a quantity which prohibits solution formation, then exposing the mixture to conditions of temperature and reduced pressure which result in removal of excess nonsolvent, e.g. water, thereby allowing solution to take place. Various types of equipment or combinations for applying said conditions of heat and reduced pressure are available for removing the excess nonsolvent such as a thin film evaporator, a Readco continuous processor as mentioned in Example 1, or vented extruder, or the like.

Referring now to FIG. 1 which is a block diagram, shredded cellulose pulp and tertiary amine N-oxide containing a nonsolvent, preferably water, are mixed in a mixer. The mixture of tertiary amine N-oxide and water is a nonsolvent for cellulose at the time of mixing because the water is present in excess. Water is removed from the mixture under conditions of heat and reduced pressure until it becomes a solvent for cellulose and the cellulose dissolves to form a solution. The resulting solution is transported by means of a pumping device through a shaping die. The resulting shaped solution is stretched to orient the molecules and the cellulose is then precipitated from the shaped solution by the application of a nonsolvent for cellulose. The stretching takes place in a nonprecipitating fluid medium. Air is the preferred medium, but nitrogen or other nonprecipitating fluid may be used.

The fibers of the invention have been tested for various properties, which are listed in Table I, along with comparative data for regular viscose rayon, cuprammonium rayon and cotton.

TABLE I

| Tensile[1] Properties | Regular[3] Viscose Rayon | Cupr-[3] ammonium Rayon | Fiber[4] of Invention | Cotton[5] |
|---|---|---|---|---|
| Conditioned | | | | |
| Tenacity, gpd[2] | 0.7–2.7 | 1.4–2.3 | 1.4–4.7 | 1.8–3.2 |
| Elongation at break, % | 15–30 | 7–23 | 7–14 | 7–9 |
| Wet | | | | |
| Tenacity, gpd[2] | 0.7–1.8 | 1.0–1.4 | 0.5–3.7 | 1.6–3.2 |
| Elongation at break, % | 20–40 | 16–43 | 7–16 | 8–10 |
| gpd Modulus/(at 5% elongation) | 3.6–4.0 | 2.0–4.0 | 7–28 | 10–20 |

Notes:
[1]ASTM Procedure No. D2101-72 using fiber length less than 10 cm.
[2]grams per denier
[3]Encyclopedia of Polymer Science and Technology, 1965, Vol. 2, p. 836.
[4]Examples II and IV - These values vary with variations in the spin-stretch ratio.
[5]Solvent Spun Rayon, Modified Cellulose Fibers and Derivatives Symposium Series 58, 1977, Table on page 5.

EXAMPLE I

A cellulose solution is prepared by mixing 1 lb., 10 oz of Buckeye V-68 wood pulp (approximately 6% water) with 8 lb., 3 oz. of N-methylmorpholine N-oxide containing about 59.6% water for approximately 1 hour and 20 minutes in a Baker-Perkins double arm mixer under vacuum with 15 psig steam in the mixer jacket. The solution is then placed in a feed tank and held at 102°–111° C. under 55 psig nitrogen pressure and pumped through a filter held at about 123° C. to a 2-inch Teledyne Readco continuous processor equipped with screws and helical paddles and sold by Teledyne Readco of York, Pa. With a rotational shaft speed of 51 rpm, the solution is transported through the processor at 103°–106° C. under a vacuum of 26 inches Hg to a second 0.584 cc/revolution gear pump running at 16 rpm which forces the solution through a spinneret having 32, 250 micron diameter holes, the temperature of which is held at 120°–125° C. The solution filaments are passed through a 12-inch air gap into a water bath and from there via appropriate guides to a winder set at 200 meters/minute takeup speed. This corresponds to a spin-stretch ratio of 31. Yarn is removed from the winder package by cutting into approximately 1¾ inches staple lengths. The resulting fiber is washed, bleached with sodium hypochlorite bleach, neutralized with dilute acetic acid and dried. Results from various tests on these fibers are given in Table II. Additional data on these fibers is given in Table IIA along with comparative data for regular viscose rayon, cuprammonium rayon and cotton.

TABLE II

| Tensile Properties | |
|---|---|
| Conditioned | |
| tenacity, gpd. | 3.1 |
| elongation at break, % | 8 |
| modulus gpd. (at 1% elongation) | 50 |
| Wet | |
| tenacity, gpd. | 2.0 |
| elongation at break, % | 9 |
| modulus gpd. (at 5% elongation) | 18 |

The modulus, as used herein, is the amount of stress, in grams per denier, required to stretch a fiber the designated amount divided by the engineering strain.

The optical swelling in Table IIA is determined by mounting the filament in paraffin wax, cutting a cross-section, washing away the paraffin with xylene and flooding the cross-section with water to swell it. A photomicrograph of the swollen cross-section is measured with a planimeter to determine the cross-sectional area. The swollen cross-section is then dried and the cross-sectional area is redetermined from a photomicrograph of the dried cross-section mounted under oil of eucalyptus. The percent optical swelling is the difference between the swollen area and the dried area divided by the dried area times 100.

The X-ray Crystallinity Index for cellulose is the ratio of the area under a wide angle equatorial scan between 8 and 32 degrees $2\theta$, neglecting background scattering, to the total area under the same curve. No provision is made in this measurement for amorphous scattering.

The fiber from Example I is subjected to a cycled autoclave treatment wherein it is presteamed at 220° F. for 10 minutes, evacuated with a drop in temperature to 205° F., resteamed for 5 single, 1000 micron diameter round hole. The monofilament is spun through an air gap and three samples are wound at speeds of 154, 428 and 1057 yards per minute, respectively, after stretching and precipitating the cellulose by application of a water spray to the takeup package. Tensile properties of the samples of yarn spun at the three different speeds are given in Table III.

Figure 2:
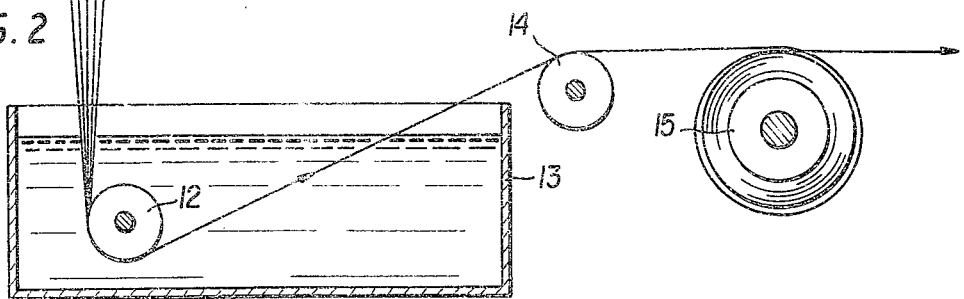
FIG. 2 is a diagrammatic representation of one embodiment of an apparatus for spinning and processing a fiber in accordance with this invention.

Referring now to FIG. 2 of the drawing, one embodiment of an apparatus for practicing the invention includes a heated extrusion apparatus having a barrel 19 provided with a conventional screw for compacting and transporting the solution and with a vent 20 for withdrawing vapors. The extrusion apparatus is disposed over a tank 13 containing water for precipitation of the

TABLE III

| | | | Conditioned | | | Wet | | |
|---|---|---|---|---|---|---|---|---|
| Sample # | Speeds Yds/min | Spin-Stretch Ratio | Ten. (gpd) | Elong. (%) | Mod. at 1% elong. (gpd) | Ten. (gpd) | Elong. (%) | Mod. at 5% elong. (gpd) |
| 1 | 154 | 116 | 4.7 | 14 | 66 | 3.7 | 16 | 23 |
| 2 | 428 | 323 | 4.6 | 13 | 97 | 3.7 | 14 | 28 |
| 3 | 1057 | 798 | 4.7 | 9 | 106 | 3.4 | 10 | 28 | cellulose. A filter 17 is connected to the downstream end of barrel 19 and a static mixer 18 is disposed between filter 17 and a metering pump 21. A spinneret 10 is connected through conduit 11 to metering pump 21 and is disposed above tank 13. A guide roller 12 is submerged in the water in tank 13 and a second guide roller 14 is disposed outside tank 13 and downstream thereof.

TABLE IIA

| ASTM Procedure | Property | Regular Viscose Rayon | | Cuprammonium | Fiber of Invention | Cotton |
|---|---|---|---|---|---|---|
| D157773 | Denier | 3 | 8 | 1.3 | 2.6 | 1.8 |
| 1505-68 | Density, g/cc | 1.487 | 1.491 | 1.519 | 1.498 | 1.543 |
| 62977 | Moisture Regain, % | 12.3 | 11.9 | 11.1 | 11.2 | 7.0 |
| D240269 | Water Retention Value, % | 83.2 | 83.4 | 83.1 | 60.7 | 38.8 |
| | Optical Swelling, % | 87 | 64 | 49 | 42 | 36 |
| D2102-72[1] | Shrinkage, % | 0.4 | −0.5 | 4.9 | −0.3 | 0.23 |
| | X-ray Crystallinity Index | 0.473 | 0.548 | 0.593 | 0.639 | 0.539 |
| (2) | Birefringence | .018 | | 0.0360 | 0.0446 | 0.069 |

[1] Single fibers tested (0.9 gm weight)
[2] By refractive index. Rayon value from Table I, Note 3 reference; cotton value from Table I, Note 3 reference, Vol. 3, p. 135.

minutes at 240° F. and evacuated with a drop to 212° F. The resteaming is repeated twice and then a third time for 8 minutes with a final exhaustion to room temperature. Tensile properties, specifically wet tenacity and wet modulus at 5% elongation, are determined and a definite increase in these properties, due to the heat treatment is observed.

EXAMPLE II

Buckeye Cellulose Corp. 10-VS cotton linters (having about 5–6% water) are ground in a Wiley mill through a 0.5 mm screen. N-methylmorpholine N-oxide is ground in a similar manner, dried to 9.5% water in a rotary vacuum dryer and mixed with 142.4 grams of the cotton linters to give approximately 19% cellulose by weight. The dried mixture is converted into a solution using a ½-inch Killion extruder (zone 1, 49° C.; zone 2, 123° C.; zone 3, head and pump block, 120° C.). The extruder speed is maintained between 20 and 50 rpm giving a pressure of between 1000 and 2000 psig. The 0.584 cc/rev metering pump is set at 1.63 rpm for spinning the cellulose solution through a spinneret having a A take-up reel 15 is located downstream of guide roller 14.

EXAMPLES IIIA THROUGH IIIE

Five yarns (A–E) are prepared in the illustrated apparatus from different portions of the same solution. Cellulose chips are first prepared by mixing 200 grams of V-68 wood pulp with a solvent containing (a) about 800 grams of N-methylmorpholine N-oxide containing 25% water and (b) about 200 ml. toluene. The flask is rotated at 40 RPM and the contents of the flask are maintained at 80° C. The toluene and water are removed under vacuum at 26.5 inches of Hg gauge over a period of 30 minutes. (All gauge pressures at approximately 2200 feet above sea level.) The water content is 15.5% at the end of this period. About 500 cc. of toluene is added and the mixture is maintained at 60° C. for two hours under vacuum to remove toluene and water. The tertiary amine N-oxide solvent remains with the cellulose. The water content is then about 13.2%.

The resulting chip product is transferred to a vacuum oven where it is maintained for four days at 50° C. under a reduced pressure of 20 inches Hg gauge to remove any remaining toluene.

The cellulose chips with absorbed solvent are fed to the extruder barrel 19 to form a homogeneous extrudable solution with the screw rotating at 20 RPM.

The temperature in the extruder barrel 19 is maintained at about 115° C. The mixture obtained in barrel 19 is transferred by the screw through filter 17 into static mixer 18. The mixture passes from mixer 18 to metering pump 21 which forces the resulting solution through conduit 11 and through openings in spinneret 10 to form filaments 16. After passing through an air gap filaments 16 are submerged in water in tank 13 where the cellulose in the filaments 16 is precipitated. The resulting fibers are guided by roller 14 to take-up reel or godet 15 where they are wound thereabout. The temperatures in static mixer 18 and in filter 17 are maintained at about 115° C. to ensure that the cellulose is dissolved and a solution substantially free from crystals of tertiary amine N-oxide and substantially free from undissolved cellulose is fed to spinneret 10. The temperature of metering pump 21 is about 130° C. and the pump is operated at about 3.65 cc per minute. Spinneret 10 has 13 openings which are round in cross-section. Each opening is about 250 microns in diameter. Filaments 16 are stretched by godet 15 after leaving Spinneret 10 at the rates indicated in Table IV. The pressure at the downstream end of barrel 19 is 3000 psi. The pressure at spinneret 10 is about 900 psi. The air gap between spinneret 10 and tank 13 is about 5 centimeters long. The temperature of the water in tank 13 is at about 20° C. The yarn on take-up reel 15 is further processed by washing with water until free of tertiary amine N-oxide, skeined and dried.

The differences in the stretching of the filaments A–E and the in properties are listed in Table IV.

TABLE IV

| Example III | A | B | C | D | E |
|---|---|---|---|---|---|
| Takeup Speed, ft/min | 250 | 200 | 150 | 100 | 67 |
| Spin-Stretch Ratio | 13.3 | 10.7 | 8.0 | 5.3 | 3.6 |
| Conditioned | | | | | |
| Tenacity, gpd | 1.9 | 1.7 | 1.8 | 1.4 | 1.9 |
| Elongation at break, % | 11.8 | 14.2 | 11.6 | 10.0 | 10.6 |
| Modulus, at 1% elongation, gpd | 84 | 69 | 78 | 68 | 70 |
| Wet | | | | | |
| Tenacity, gpd | 0.5 | 0.6 | 0.6 | 0.6 | 0.8 |
| Elongation at break, % | 7.3 | 10.5 | 8.2 | 10.1 | 9 |

EXAMPLES IV A THROUGH IV H

Figure 3:
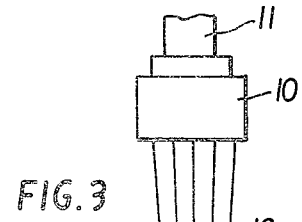
FIG. 3 is a diagrammatic representation of a first modification of the apparatus of FIG. 2.

Cellulose chips prepared as described in Example III and dried to a moisture content of about 9.7% are transferred to barrel 19 of the apparatus of FIG. 2, heated and spun to form filaments 16. Filaments 16 are drawn prior to precipitation of the cellulose by take-up roller 15 through the water in tank 13 where precipitation of the cellulose occurs. The filaments 16 pass over guide rolls 12 and 14. A roller 23 wet with water is disposed between spinneret 10 and tank 13 as shown in FIG. 3. The water on roller 23 precipitates the cellulose at the surface of filaments 16.

Figure 4:
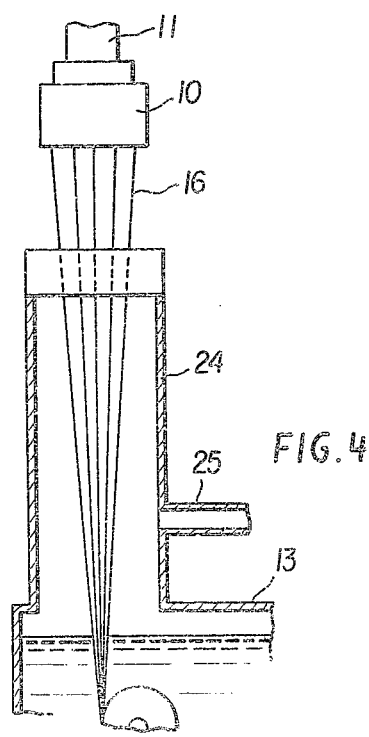
FIG. 4 is a diagrammatic representation of a second modification of the apparatus of FIG. 2.

Roller 23 shown in FIG. 3 may be replaced with a fog chamber 24 as shown in FIG. 4 to partially precipitate the cellulose from the surface of the solution. Moist air is introduced into chamber 24 through conduit 25.

Since partial precipitation may take place in the fog chamber, stretching, as contemplated by the invention, may continue to take place in the fog chamber, i.e., in the parts of the fibers not yet precipitated, with attendant modification of physical properties.

Eight yarns are prepared by spinning the solution with the speeds of roller 23 and godet 15 being varied as indicated in Table V.

TABLE V

| Example IV | Surface Speed of Roller 23 feet/min | Surface Speed of Roller 15 feet/min | Spin-Stretch Ratio |
|---|---|---|---|
| A | 30 | 107 | 2.6 |
| B | 30 | 165 | 4.1 |
| C | 30 | 291 | 7.2 |
| D | 45 | 390 | 9.6 |
| E | 52 | 499 | 12.3 |
| F | 52 | 750 | 18.4 |
| G | 52 | 960 | 23.6 |
| H | 52 | 1062 | 26.1 |

The physical properties determined on the yarns are recorded in Table VI.

TABLE VI

| Example IV | A | B | C | D | E | F | G | H |
|---|---|---|---|---|---|---|---|---|
| Spin-Stretch Ratio | 2.6 | 4.1 | 7.2 | 9.6 | 12.3 | 18.4 | 23.6 | 26.1 |
| Denier per filament Conditioned | 48.7 | 33.3 | 17.6 | 14.1 | 11.0 | 7.3 | 5.6 | 5.3 |
| Tenacity, gpd | 0.9 | 1.2 | 1.8 | 2.4 | 2.4 | 2.7 | 3.2 | 3.2 |
| Elongation at break, % | 17.3 | 13.0 | 10.0 | 8.5 | 6.8 | 6.6 | 7.5 | 7.1 |
| Modulus at 1% elongation, gpd | 29.4 | 41.8 | 80.7 | 98.2 | 105.6 | 107.7 | 104.0 | 109.4 |
| Modulus at 5% elongation, gpd. | — | — | — | — | — | — | 45.4 | 47.9 |
| Wet | | | | | | | | |
| Tenacity, gpd | 0.8 | 0.5 | 0.8 | 1.2 | 1.4 | 1.7 | 1.9 | 1.7 |
| Elongation at break, % | 19.2 | 17.3 | 10.6 | 8.8 | 7.7 | 6.8 | 7.6 | 7.1 |
| Modulus at 5% Elongation, gpd | 3.1 | 2.6 | 7.0 | 12.7 | 16.5 | 25.8 | 22.7 | 21.2 |

It is preferred that the wet modulus of the fiber of the invention be at least about 7, but as shown under Samples A and B in Table V, with lower spin-stretch ratios a wet modulus lower than 7 may be obtained.

A process and apparatus of the type illustrated in FIGS. 2-4 for wetting the surface of filaments 16 are described and illustrated in my application Ser. No. 847,200 filed Oct. 31, 1977, the disclosure of which is incorporated herein by reference.

As disclosed in application Ser. No. 938,907 filed Sept. 1, 1978, the percentage of water mixed with the tertiary amine N-oxide in the solvent for cellulose will vary from one tertiary amine N-oxide to the other in an amount to a maximum of about 29% by weight based on the weight of the solution and may be within the range of from about 1.4% to about 29% by weight based on the weight of the solution. The amount of cellulose that may be dissolved in the solvent in accordance with the invention is from about 2% to about 44%, preferably, about 10% to about 35% by weight based on the weight of the solution.

With solvents in which the tertiary amine N-oxide is N-methylmorpholine N-oxide, the water content in the solvent may be up to about 22% by weight and the cellulose content may be up to about 38% by weight based on the total weight of the solution. The amount of water to be included in the solvent and the amount of cellulose that can be dissolved in the solvent when it contains other tertiary amine N-oxides are recorded in Table VI.

TABLE VI
EXAMPLES OF TERTIARY AMINE N-OXIDE SOLVENTS

| Tertiary Amine N-oxide | % Water | % Cellulose |
| --- | --- | --- |
| N-methylmorpholine N-oxide | up to 22 | up to 38 |
| N,N-dimethylethanol-amine N-oxide | up to 12.5 | up to 31 |
| N,N-dimethylcyclo-hexylamine N-oxide | up to 21 | up to 44 |
| N-methylhomopiperidine N-oxide | 5.5-20 | 1-22 |
| N,N,N-triethylamine N-oxide | 7-29 | 5-15 |
| 2(2-hydroxypropoxy)-N-ethyl-N,N,-dimethyl-amine N-oxide | 5-10 | 2-7.5 |
| N-methylpiperidine N-oxide | up to 17.5 | 5-17.5 |
| N,N-dimethylbenzyl-amine N-oxide | 5.5-17 | 1-20 |

With each of the tertiary amine N-oxides, the amount of cellulose that can be dissolved will decrease substantially linearly as the water content is increased. The lower limit of water content is not always obtained by ordinary methods of removing water, such as evaporation. For example, N,N,N-triethylamine N-oxide begins to decompose at below about 11% water.

An organic diluent may be used in quantities up to about 25% by weight of the total solution as an inexpensive diluent for the tertiary amine N-oxide or to lower the viscosity of the solution, if desired. Any aprotic, organic, liquid nonsolvent for cellulose which will not react chemically with the tertiary amine N-oxide or cause degradation of the cellulose and have a high degree of polarity, i.e., a dipole moment greater than about 3.5 Debyes, is suitable, such as for example, dimethylsulfoxide; N,N-dimethylformamide; N,N-dimethylacetamide; N-methylpyrrolidinone; hexamethylphosphoric triamide; acetonitrile; sulfolane or the like. Dipole moments of organic, liquid diluents described above that can be used with tertiary amine N-oxide solvents are shown in the following table:

| Compound | Dipole Moment |
| --- | --- |
| N,N-dimethylformamide | 3.82 Debyes |
| N,N-dimethylacetamide | 3.79 Debyes |
| Dimethylsulfoxide | 3.98-4.3 Debyes |
| N-methyl-2-pyrrolidinone | 4.09 Debyes |
| Sulfolane | 4.69 Debyes |
| Acetonitrile | 3.84 Debyes |

Any suitable cellulose may be used in the process such as, for example, cotton linters or various grades of wood cellulose. The precipitated cellulose has a cellulose II structure instead of the native cellulose I structure.

Staple fibers prepared in accordance with this invention can be used in making nonwoven pads for absorption of body fluids similar to pads presently made with rayon staple fibers such as tampons, sanitary napkins, medical bandages and the like while fibers in the form of threads or yarns can be woven into fabrics or used as reinforcing cords for elastomeric or plastomeric articles such as, for example, as a cord in a vehicle tire. Fibers prepared according to the invention are particularly useful for washable fabrics since they do not lose their shape in washing and fabric made into draperies, etc., do not elongate more at high humidity than they do at low humidity. Films prepared in accordance with invention can be used for wrapping and packaging materials.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed:

1. A process for making a cellulose fiber or film which comprises
    extruding a solution containing a cellulose dissolved in a tertiary amine N-oxide solvent containing a nonsolvent for cellulose to shape the solution as a film or filament, stretching the film or filament while still a solution to orient the molecules and develop improved physical properties in said cellulose fiber or film, and
    precipitating the cellulose from said solution to set the properties thereof without additional drawing.
2. The process of claim 1 wherein the product is a fiber.
3. The process of claim 1 wherein the product is a film.
4. The process of claim 1 wherein the stretching is at a spin-stretch ratio of at least 3.
5. The process of claim 1 wherein said nonsolvent for cellulose is water.
6. A process for making a cellulose fiber having a wet elongation about equal to its conditioned elongation, a tenacity of at least about 1.4 gpd and a wet modulus of at least about 7 gpd at 5% elongation which process comprises spinning through a spinneret a solution containing cellulose dissolved in a solvent which contains a tertiary amine N-oxide solvent for cellulose and an organic non-solvent for cellulose which is miscible with the tertiary amine N-oxide, pulling the resulting filament as it emerges from said spinneret at a 3 to 1 spin-stretch ratio to orient the molecules while the cellulose remains in solution, and then into a non-solvent for cellulose which precipitates the cellulose from the spun solution.

* * * * *